E. F. HARTLOVE.
CAN SOLDERING MACHINE.
APPLICATION FILED OCT. 14, 1908.
937,524.
Patented Oct. 19, 1909.
5 SHEETS—SHEET 1.
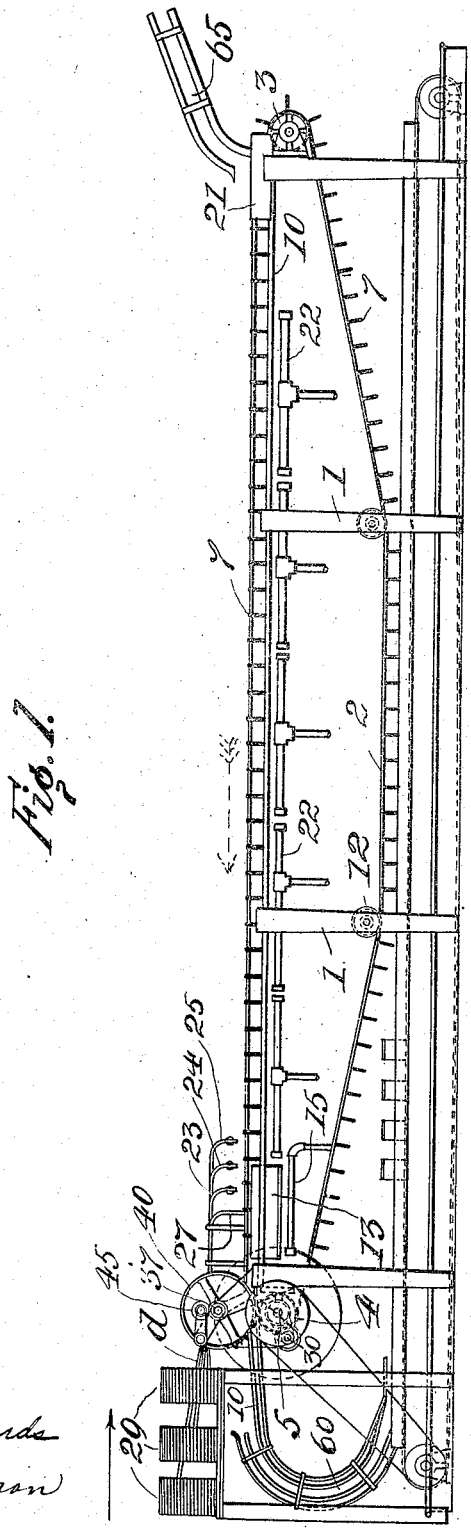
Witnesses
Alberta Richards
Elwood Bozman
Inventor
Emory F. Hartlove,
by G. H. W. T. Dorsett.
Attorneys

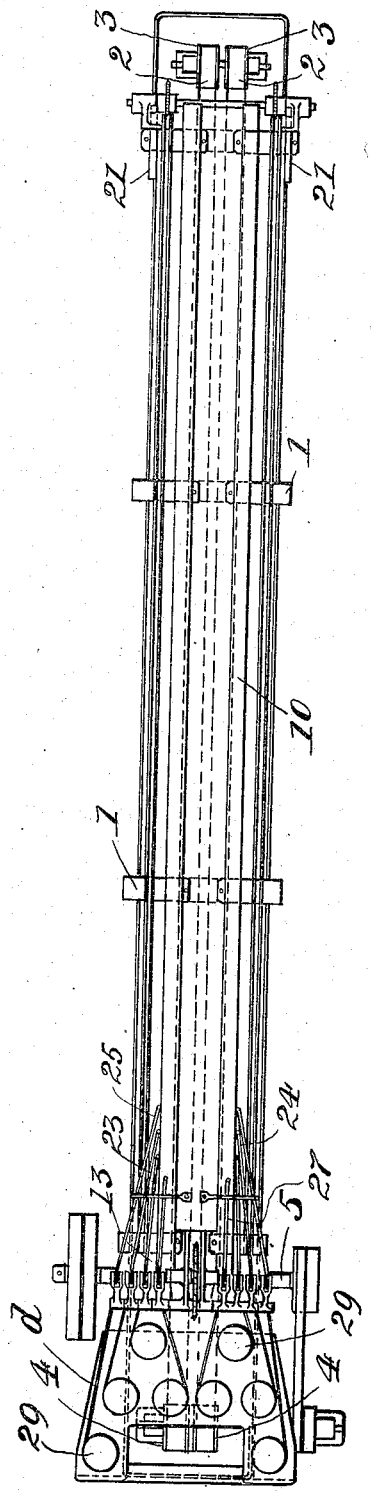

E. F. HARTLOVE.
CAN SOLDERING MACHINE.
APPLICATION FILED OCT. 14, 1908.
937,524.
Patented Oct. 19, 1909.
5 SHEETS—SHEET 3.
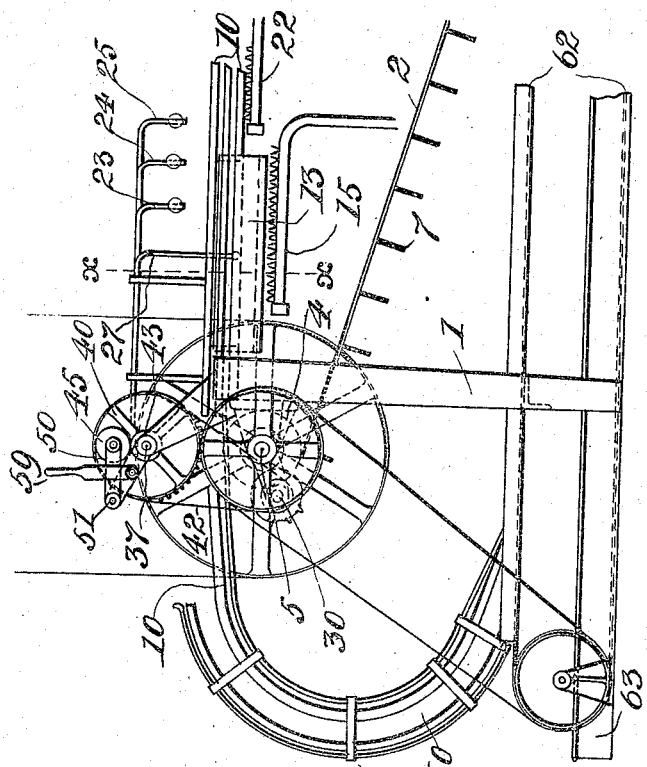
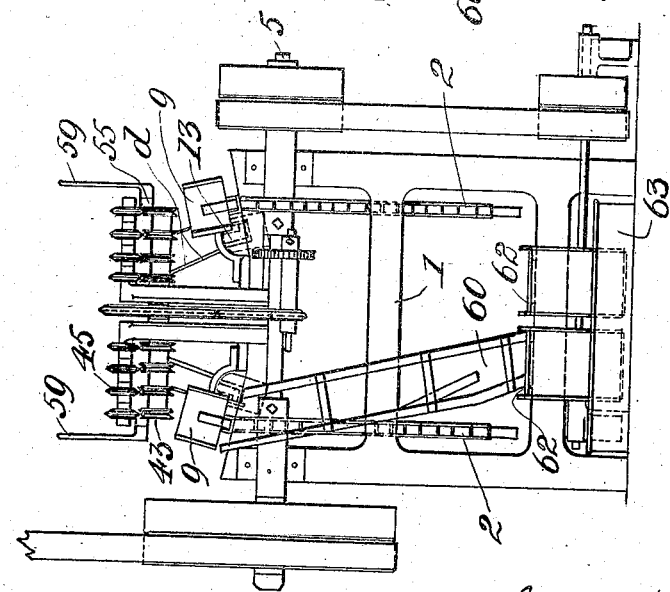

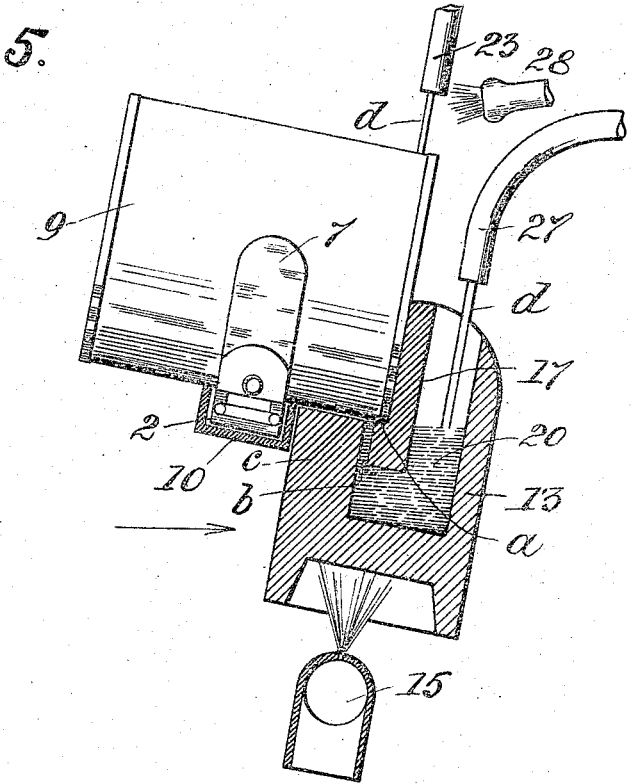
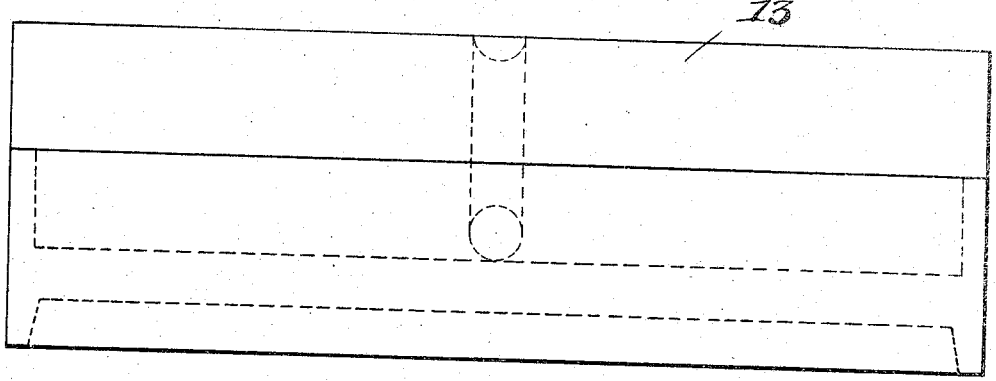

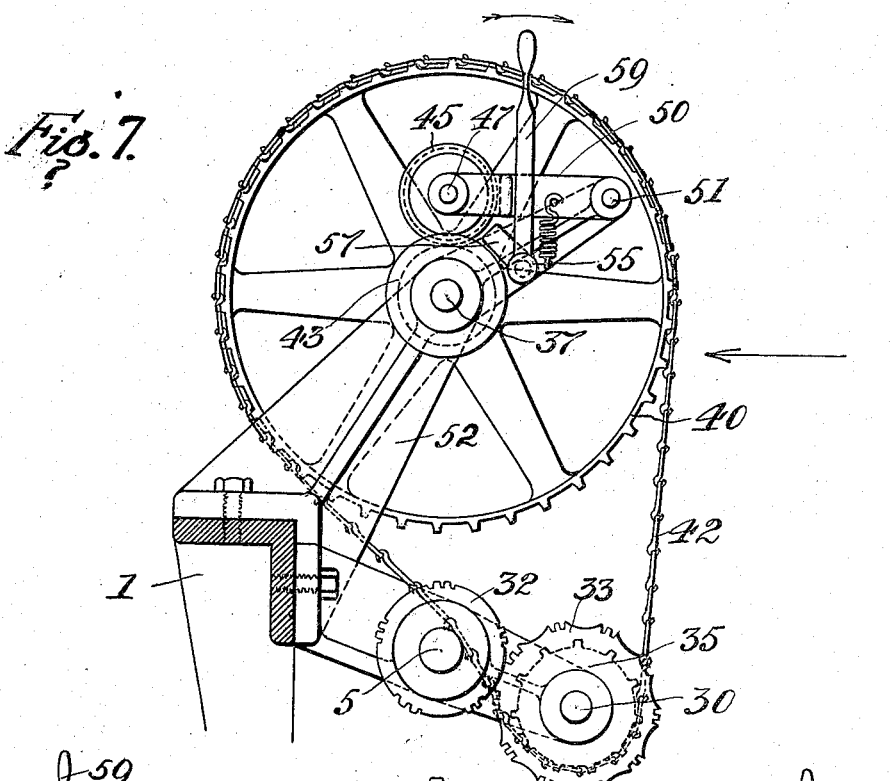
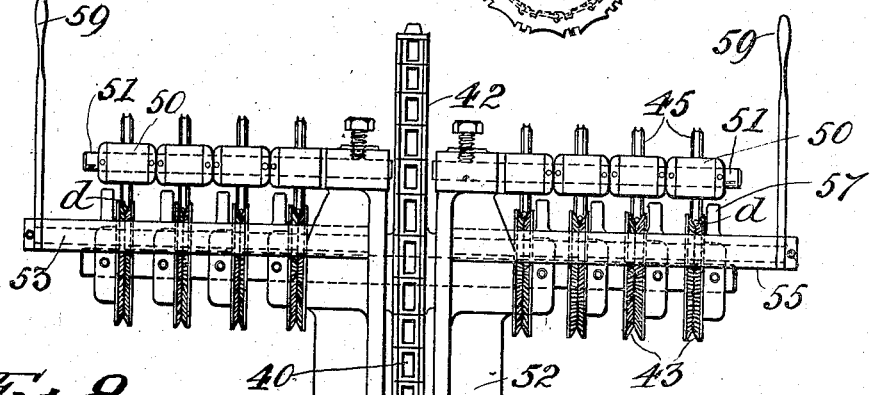
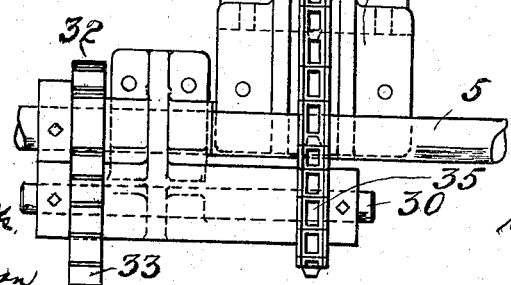

UNITED STATES PATENT OFFICE.

EMORY F. HARTLOVE, OF BALTIMORE, MARYLAND.

CAN-SOLDERING MACHINE.

937,524.  Specification of Letters Patent.  Patented Oct. 19, 1909.

Application filed October 14, 1908. Serial No. 457,606.

*To all whom it may concern:*

Be it known that I, EMORY F. HARTLOVE, of the city of Baltimore and State of Maryland, have invented certain Improvements in Can-Soldering Machines, of which the following is a specification.

This invention relates to the soldering of the head joints of sheet-metal cans.

The said invention consists in the application of wire solder to the body of a heated can when the same is rolling in an inclined position, at a point which is directly above the edge of the flange of the head, whereby the solder in flowing downward will enter the joint without passing over the outside of the flange.

It further consists in the employment with the devices whereby solder is applied to the head joint, as described, a molten solder bath having a narrow longitudinally extending slot in which the melted solder is exposed to the portion only of the body of the rolling can to which solder has been applied. By this means the portion of the can body upon which the solder melted by touching the heated can, has been deposited, is brought into contact with a body of melted solder which owing to the narrowness of the channel in which it is contained has a convex or rounded surface which uniting with the solder on the body, conducts practically all the solder thereon to the bath, the solder remaining on the body having no appreciable thickness.

It further consists in feeding the wire solder to the joint of the rolling can intermittingly, and to a limited portion of its circumference, in order that only a predetermined and sufficient quantity of solder wire will be melted by contact with the heated can.

In the further description of the said invention which follows, reference is made to the accompanying drawings, forming a part hereof and in which,—

Figure 1 is an exterior side view of the improved can-soldering machine, and Fig. 2 a plan of the same. Fig. 3 is an enlarged end view of certain parts of Fig. 1 looking in the direction indicated by the arrow in that figure. Fig. 4 is an enlarged exterior side view of a portion of the machine. Fig. 5 is a still further enlarged section of Fig. 4 taken on the dotted line $x$—$x$, together with a side view of a can which is shown in soldering position. Fig. 6 is an exterior side view of the solder bath shown in Fig. 5, looking in the direction indicated by the arrow in that figure. Fig. 7 is a much enlarged view of certain parts of the machine shown in Figs. 1 and 4, as seen from the far side thereof, and Fig. 8 a view of Fig. 7 looking in the direction indicated by the arrow in that figure, with certain parts thereof removed, and including certain attachments not illustrated in Fig. 7.

Referring now to the drawings, 1 is the frame of the machine, and 2, 2 are endless belts or sprocket chains placed side by side on the machine, the said belts being supported by the pulleys 3 and 4, the former situated at the receiving, and the latter at the delivery end of the machine and secured to the driving shaft 5. These belts or sprocket chains are provided with carriers 7 for the cans which are denoted by 9. The belts or chains 2 move in the direction indicated by the dotted arrow in Fig. 1, and the upper lay of each chain is supported in an inclined position by a straight rail 10, while the lower lay passes under idle tightening pulleys 12 shown only in Fig. 1.

13 is a bath containing solder which is kept in a molten condition by flames issuing from the pipe 15. Two baths are employed, one at each side of the machine, but they being identical in construction, one only is illustrated.

By reference to Fig. 5, it will be seen that the bath is provided with a partition 17 a portion $a$ of which serves as a bearing for the flange of the can head during the soldering operation; and that the space $b$ between the portion $a$ of the partition 17 and the wall $c$ is made narrow in order that only a limited portion of the body of the can adjacent to the flange of the head comes into contact with the molten solder which is represented by 20. It will also be seen that the main body of molten solder in the bath 13 is on a slightly lower plane than the bearing $a$, and in consequence, no solder rests on the said bearing, and cannot therefore come in contact with the head of the can; and the peculiarity of liquids contained in narrow spaces to assume a rounded surface or one in which the center is higher than the edges surrounding the space, is availed of in this invention to bring the melted solder against the joint of the can which is elevated slightly above the bearing.

The cans being in an inclined position naturally bear against the partition 17 in their rolling movement along the rail 10, and no additional guide is therefore required except at the entrance end of the machine where a plate 21 of limited length (shown only in Figs. 1 and 2) is employed for the purpose.

The cans before the application thereto of solder are heated by minute flames which issue from apertures in pipes 22 which contain a mixture of gas and air under pressure, and the cans are by this means retained at such a temperature as will cause them to melt the ends of wire solder with which they come in contact in the operation of the machine hereinafter described.

23, 24 and 25 are tubes through which wire solder is fed by means hereinafter described, to the can body adjacent to the joints to be soldered, and 27, a similar tube through which wire solder is supplied to the bath 13.

The ends of the tubes which conduct the solder wire to the can joint, and the wire issuing therefrom may be slightly heated in order to facilitate the melting of the wire when brought into contact with the heated can; and in Fig. 5 is shown a burner denoted by 28 so placed as to answer the purpose.

For reasons hereinbefore briefly explained, it is desirable that the wire solder should be fed intermittingly to the joints of the cans, and to effect this result, the following mechanism is employed. 29, 29 are spools (see Figs. 1 and 2) upon which the wire solder $d$ is wound. These spools are situated at the delivery end of the machine, and the solder wires are extended through the tubes 23, 24 and 25 and to the path taken by the joints of the cans as the cans are rolled along the machine, and one wire is conducted into and through the tube 27 which leads to the solder bath 13.

At a point between the spools and the bath, and extending transversely of the machine, is a suitably supported shaft 30 which is intermittingly rotated from the driving shaft 5 by means of the mutilated gear wheels 32 and 33; and to the shaft 30 is secured the sprocket wheel 35. 37 is another shaft shown as situated directly over the driving shaft 5, carrying a sprocket wheel 40 which is much larger than the one 35, and driven from the latter by means of the sprocket chain 42.

On the shaft 37 are secured the grooved feed wheels 43 upon which rest the solder wires $d$ leading from the spools 29 to the tubes 23, 24 25, and 27; and in order that these wheels will effectively feed the said solder wires forward, there is placed over each feed wheel, a spring-held tightening wheel 45 which rests on the solder wire and clamps the same so that the rotary movement of the feed wheel will communicate a longitudinal forward motion to the solder wire.

All the tightening wheels 45 are loose on pins 47 which are supported by arms 50 the hubs of which are loose on a shaft 51 carried by extensions of the brackets 52 (see Figs. 7 and 8) which sustain the rotary shaft 37.

It will be understood that the solder wire is fed by friction due to the pressure exerted by the tightening wheels 45 upon the wire and which press it against the wheels 43 the grooves of which may be roughened if required; and that if the tightening sheaves are lifted, feeding of the solder wires is suspended. I therefore place over the fixed rod 53, the sleeve 55 (see Figs. 7 and 8) and provide the said sleeves with toes 57 which are directly beneath the arms 50. Each sleeve is provided with a handle 59 which if turned in the direction indicated by the curved arrow in Fig. 7, brings the toes 57 into contact with the underside of the links 50 and raises them thereby lifting the tightening wheels from contact with the solder wires. Feeding of the solder is then suspended until the tightening wheels are allowed to fall to their original position and again bear on the wires.

The delivery end of each of the rails 10 is slightly inclined downward as shown to the left of Figs. 1 and 4, and leads into a delivery chute 60 which serves to conduct the cans to the upper lay of an endless moving belt 62 which passes through a tray 63 supplied with sufficient water to keep the belt wet. By this arrangement the solder in the newly soldered joints of the cans is chilled as the cans are carried to the entrance end of the machine.

The machine being in operation, unsoldered cans leaving the entrance chute 65 fall on the endless belt or chain 2 and being caught by the carriers 7 are carried forward and heated by gas jets issuing from the pipes 22. When the cans reach the ends of the solder wires, the solder is melted and flows into the joints between the heads and bodies of the cans, and all surperfluous solder as the cans are rolled forward, is conducted by the solder in the narrow channel to the molten solder in the bath. The intermittent action of the solder feeding devices is of importance in that it results in a decided economy of solder in the form of wire, and without any risk of producing defective joints.

It will be understood that in the soldering operation, the cans have to pass twice through the machine as one joint only is soldered in a single passage; and that the cans after the first soldering operation are transferred to the second entrance chute (not shown) by which they are deposited on the second endless belt or chain in a rev---- position and the soldering operation described is repeated, when the cans are finally delivered with both their heads soldered.

I claim as my invention,—

1. In a soldering machine, a molten solder bath, and means to roll the headed end of a can while the can is in an inclined position, along the bath with the body only of the can in contact with the solder, combined with devices to carry the end of a solder wire over the bath, substantially as specified.

2. In a soldering machine, a molten solder bath, and means to roll the headed end of a can while the can is in an inclined position, along the bath with the body of the can only in contact with the solder, combined with devices to carry the end of a solder wire into the path taken by the portion of the body adjacent to the head joint, substantially as specified.

3. In a soldering machine, a molten solder bath, means to roll the headed end of a can while the can is in an inclined position, along and over the solder in the bath, and devices to carry the end of a solder wire into the path taken by the body adjacent to the head joint, combined with means to intermittingly feed the wire solder through the carrying devices, substantially as specified.

4. In a soldering machine, a molten solder bath, means to roll the headed end of a can while the can is in an inclined position along and over the solder in the bath, and devices to carry the end of a solder wire into the path taken by the head joint, combined with means to intermittingly feed the wire solder through the carrying devices, and burners to heat the cans before the same reach the solder, substantially as specified.

5. In a soldering machine, a molten solder bath, means to roll the headed end of a can while the can is in an inclined position, over the solder bath, a tube with one of its ends placed in the path taken by the head joint combined with devices to heat the cans before they reach or come under the said tube, and appliances to intermittingly feed solder wire through the said tube, substantially as specified.

6. In a soldering machine, a molten solder bath, means to roll the headed end of a can while the can is in an inclined position through the solder bath, and devices to carry the end of a solder wire over the solder bath and into the path taken by the head joint, combined with burners whereby the cans are heated before reaching the solder wire, substantially as specified.

7. In a soldering machine, a molten solder bath, means to roll the headed end of a can while the can is in an inclined position, through the solder bath, a tube with one of its ends placed over the solder bath and in the path taken by the head joint, combined with devices to heat the cans before they reach or come under the said tube and appliances to feed solder wire through the said tube, substantially as specified.

EMORY F. HARTLOVE.

Witnesses:
  A. W. HARTLOVE,
  WILMER EMORY.